(12) United States Patent
Kropp (10) Patent No.: US 7,092,597 B2
(45) Date of Patent: Aug. 15, 2006

(54) BIDIRECTIONAL TRANSMITTING AND RECEIVING DEVICE

(75) Inventor: Jörg-Reinhardt Kropp, Berlin (DE)

(73) Assignee: Infineon Technologies AG, Munich (DE)

( * ) Notice: Subject to any disclaimer, the term of this patent is extended or adjusted under 35 U.S.C. 154(b) by 62 days.

(21) Appl. No.: 10/797,381

(22) Filed: Mar. 10, 2004

(65) Prior Publication Data

US 2004/0223705 A1 Nov. 11, 2004

(30) Foreign Application Priority Data

Mar. 10, 2003 (DE) ................................ 103 11 570

(51) Int. Cl.
*G02B 6/32* (2006.01)
(52) U.S. Cl. ............................. 385/33; 385/15; 385/27; 385/31; 385/49
(58) Field of Classification Search .................. 385/15, 385/27, 31, 39, 33, 49
See application file for complete search history.

(56) References Cited

U.S. PATENT DOCUMENTS

| 4,063,083 A | 12/1977 | Cathey et al. |
| 5,202,567 A | 4/1993 | Hamanaka |
| 6,493,121 B1 | 12/2002 | Althaus |
| 6,741,777 B1 * | 5/2004 | Jewell et al. .................. 385/49 |

FOREIGN PATENT DOCUMENTS

| DE | 43 13 486 C2 | 6/1994 |
| DE | 44 35 928 A1 | 4/1995 |
| DE | 100 64 599 A1 | 7/2002 |
| WO | WO 99/57594 | 11/1999 |

* cited by examiner

*Primary Examiner*—Sung Pak
*Assistant Examiner*—James D. Stein
(74) *Attorney, Agent, or Firm*—Eschweiler & Associates, LLC

(57) ABSTRACT

A bidirectional transmitting and receiving device includes a transmitting component with an emission area of a first size, and a receiving component with a receiving area of a second size. The device further includes coupling optics for coupling light between the transmitting component and the receiving component on the one hand, and an optical waveguide to be coupled thereto on the other hand. The coupling optics have two imaging systems that are arranged one behind the other such that the light that is emitted from the transmitting component is imaged by the first imaging system on an intermediate plane on which the receiving component is located, and in the process passes through the receiving component or passes by it at the side. The second imaging system is used to image firstly the light that is emitted by the transmitting component from the intermediate plane onto the end surface of the optical waveguide and, secondly, the light that is emitted by the optical waveguide onto the receiving area of the receiving component.

20 Claims, 8 Drawing Sheets

BIDIRECTIONAL TRANSMITTING AND RECEIVING DEVICE

REFERENCE TO RELATED APPLICATIONS

This application claims the benefit of the priority date of German Application DE 103 11 570.6, filed on Mar. 10, 2003, and is related to U.S. application Ser. No. 10/797,814, filed on Mar. 10, 2004 the contents of which are herein incorporated by reference in their entirety.

FIELD OF THE INVENTION

The invention relates to a bidirectional transmitting and receiving device.

BACKGROUND OF THE INVENTION

Bidirectional optical modules are known which communicate with one another using a monomode glass fiber in the opposite direction. The modules comprise a transmitting component, a receiving component and an optical arrangement, by means of which the beam paths are superimposed and split. The light that is emitted from the transmitting component generally, but not necessarily, is at a different wavelength than the light which is detected by the receiving component. For example, the transmitting component emits light at a wavelength of 1300 nm, and the receiving component detects light at the wavelength of 1550 nm. A module of the cited type is known from WO 99/54594 A1. A partially reflective mirror which acts on a wavelength-selective basis is provided in order to split the beam paths, is arranged at an angle of 45° in the beam path of the fiber, and outputs light at a wavelength at an angle of less than 90°. If operated at the same wavelength, instead of a mirror that acts on a wavelength-selective basis, a partially reflective mirror is used. The known bidirectional module disadvantageously requires relatively complex optical and mechanical design technology.

The use of polymer fibers with a diameter of 1 mm for bidirectional communication at the same wavelength is known from the automotive field. Bidirectional modules with a relatively large receiving diode are used in this case. An LED chip is fitted to the center of the receiving diode. The photodiode is admittedly partially shadowed by the LED chip, but the sensitivity of the transmission quality is sufficient for automotive applications. A corresponding design is described in DE 100 64 599 A1.

SUMMARY OF THE INVENTION

The present invention is based on the object of providing a bidirectional transmitting and receiving device, which is distinguished by a simple design and, for this purpose, does not need to use interference filters and a bent beam path. In contrast to the situation with the solutions that are known from the automotive field, a further aid is also to allow the use of relatively small photodiodes.

According to the invention, this object is achieved by a bidirectional transmitting and receiving device.

The solution according to the invention is accordingly distinguished in that coupling optics are used with two imaging systems which are arranged one behind the other. The transmitting component and the receiving component are located on different planes. The light that is emitted from the transmitting component is imaged by means of the first imaging system on an intermediate plane on which the receiving component is located. The light that is emitted from the transmitting component in this case passes through the receiving component, or passes by it at the side. The second imaging system is used to image firstly the light which is emitted by the transmitting component from the intermediate plane onto the end surface of the optical waveguide and, secondly, the light which is emitted by the optical waveguide onto the receiving area of the receiving component.

The light from the transmitting component is thus first of all imaged on an intermediate plane, on which the detector for the light to be detected is located. The transmission light passes through the detector plane from the rear. The second imaging system images the radiation on the end surface of the optical waveguide. The radiation that emerges from the waveguide in the opposite direction is imaged by the second imaging system on the detector.

The solution according to the invention provides a bidirectional transmitting and receiving device which does not need to use interference filters or a bent beam path. It is based on the idea that the light that is emitted from the transmitting component is focused by the first imaging system on the intermediate plane. This focusing means that only a small area is used on the intermediate plane, so that the radiation passes through the receiving component in a comparatively small subregion, or the receiving component can be designed such that the light passes by the receiving component at the side. In consequence, the sensitivity of the receiving component is decreased only slightly.

Owing to the focusing, the receiving component may also be designed to be relatively small. The image of the emission area of the transmission component on the plane of the receiving component is minimal, so that its area is also small in comparison to the receiving area in the case of small receiving components.

The invention also makes it possible to arrange the transmitting component at a desired physical distance from the receiving component. This therefore provides a high degree of flexibility in the arrangement of the transmitting component and receiving component with respect to one another.

In one preferred refinement of the invention, the image plane for the imaged light from the end surface of the optical waveguide is located on the same plane as the intermediate plane of the first imaging system. This ensures that the emission area of the transmitting component is imaged as far as possible in the form of a point on the end surface of the optical waveguide.

A further preferred refinement accordingly provides for the light which is emitted from the transmitting component to be injected into a comparatively small subregion of the end surface of the optical waveguide, while the light which is to be received and is distributed over the entire end surface of the optical waveguide is imaged on the receiving area of the receiving component.

Provision is also preferably made for the image of the transmitting component on the intermediate plane to be located within the end surface of the optical waveguide that is imaged by the second imaging system. Accordingly, the image of the transmitting component on the intermediate plane is also smaller than the receiving area of the receiving component that is arranged on the intermediate plane. The image of the transmitter on the intermediate plane is preferably in this case considerably smaller than the receiving area of the receiving component, and is preferably at most ⅓ of the receiving area. This ensures that only a small region of the receiving area of the receiving component is unusable for detection of the radiation to be detected, insofar as the light that is emitted from the transmitting component passes through this region.

It should be mentioned that the imaging system does not necessarily provide 1:1 imaging, but may likewise provide an enlarged or smaller image. This means that it is also possible to image transmitting components with relatively large emission areas on a comparatively small area on the intermediate plane, so that the sensitivity of the receiving component is reduced only slightly. It is likewise possible, for example, to image a relatively small end surface of the optical waveguide on a relatively large receiving area of the receiving component by means of an enlarged image of the second imaging system, such that the region which is unusable for detection and through which the light which is emitted from the transmitting component passes is once again comparatively small in comparison to the receiving area (active area) of the receiving component, and the sensitivity and transmission quality are accordingly scarcely reduced.

In a further preferred refinement of the invention, the second imaging system has a diffractive lens that focuses light at different wavelengths differently. In this case, the intermediate plane on which the light from the transmitting component is imaged is located at the focus of the diffractive lens for the emitted wavelength, so that light which is emitted from the transmitting component is imaged on a small region of the end surface of the optical waveguide, while the receiving component is located away from the focus of the diffractive lens for the received wavelength, and light which is emitted from the optical waveguide at the second wavelength is recorded in a region which is widened again or has not yet been focused. Since the receiving component records the light to be detected in an unfocussed region, the detection area can and must be relatively large. The unusable region, through which the light from the transmitting element passes, is then negligible in comparison to the total receiving area.

This embodiment variant ensures that the sensitivity of the receiving component is scarcely reduced, even in the case of small-diameter optical waveguides.

A diffractive lens is in this case a lens whose beam-forming effect is produced by interference between different light components, but not by light refraction as in the case of refractive lenses. Diffractive lenses are, in particular, Fresnel lenses as well as holographic lenses. In a Fresnel lens, rings are provided in an adjacent zone, whose separation decreases in the outward direction, while having the same total area. A lens such as this is also referred to as a "Fresnel zone plane". Lenses such as these are known to those skilled in the art, so that they will not be described in any more detail here.

The light that is emitted from the transmitting component passes through the receiving component on the intermediate plane. Provided that the receiving component is not sensitive and is transparent for the wavelength emitted from the transmitting component, the radiation from the transmitting component passes through the receiving component without any further measures.

If the substrate of the receiving component is transparent for the transmitter radiation, but the receiving area (the active area) of the receiving component absorbs this radiation and/or is sensitive to it, a small-diameter region in the receiving area of the receiving component is preferably kept free for the radiation from the transmitting component which is located underneath to pass through.

If the substrate of the receiving component is not transparent for the radiation from the transmitting component, then a small opening is preferably formed in the receiving component, through which the light that is emitted from the transmitter component passes.

In both the situations mentioned above, the transmitting component and the receiving component can be shifted with respect to one another such that the image of the transmitting component is located in a side area of the receiving component rather than in the center. The only important factor is that the image of the transmitting component is located on the intermediate plane within the end area of the optical waveguide which is imaged by the second imaging system, thus ensuring that the emitted light is injected into the optical waveguide.

Furthermore, it is also possible to provide for the area that the light from the transmitting component passes through on the intermediate plane to be located to the side of the receiving component, with the latter being shifted with respect to the transmitting component or having a reduced area. In this situation as well, the image of the transmitting component is located on the intermediate plane, but within the end surface of the optical waveguide which is imaged by the second imaging system.

In one preferred embodiment of the invention, the first imaging system is formed on one face of a substrate, on whose opposite face the receiving component is arranged or formed. This results in a compact arrangement, which is easy to adjust.

In a further preferred refinement, the transmitting component, the first imaging system and the receiving component are encapsulated with transparent plastic encapsulation which forms the second imaging system. The plastic encapsulation in this case preferably additionally forms a coupling area for an optical waveguide. This results in a compact arrangement with protected components and a protected beam path.

BRIEF DESCRIPTION OF THE DRAWINGS

The invention will be explained in more detail in the following text using a number of exemplary embodiments and with reference to the figures of the drawing, in which.

DETAILED DESCRIPTION OF THE INVENTION

Figure 1:
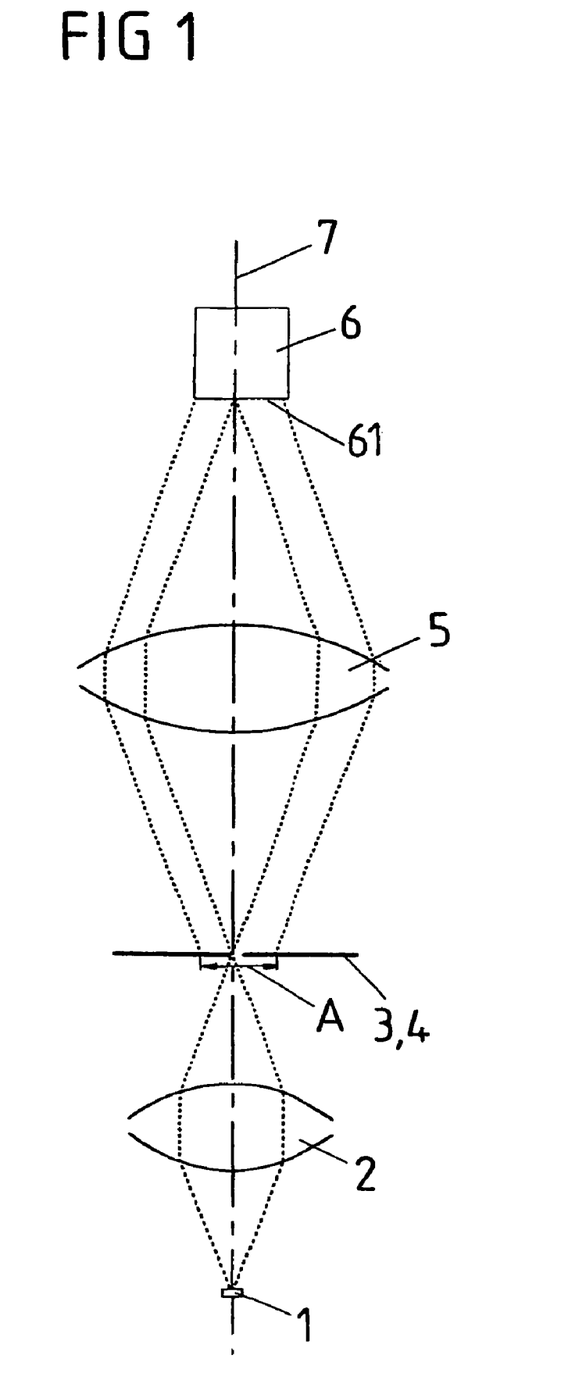
FIG. 1 shows, schematically, the basic design of a bidirectional transmitting and receiving device with a bidirectional beam path and two imaging systems which are arranged one behind the other.

FIG. 1 shows, schematically, the basic configuration of a bidirectional transmitting and receiving device. A transmitting component 1 and a first imaging system 2 are arranged behind one another along the optical axis 7 of the device, and a receiving component 4, a second imaging system 5 and an optical fiber 6 are arranged with respect to an intermediate plane 3.

The first imaging system in the illustrated exemplary embodiment is in the form of a refractive lens 2, and images the transmitting component 1, and its emission area, at the intermediate plane 3. The light which is imaged from the transmitting component 1 on the intermediate plane 3 is imaged by the second imaging system 5, which is likewise in the form of a refractive lens in the illustrated exemplary embodiment, on the end surface 61 of the optical fiber. The light that emerges from the end surface 61 of the optical fiber is imaged via the second imaging system 5 on the receiving component 4, which is arranged on the intermediate plane 3.

In this case, provision is made for the imaging plane for the imaged light from the end surface 61 of the optical waveguide 6 to be the same as the intermediate plane 3 on which the light from the transmitting component 1 is imaged by the first imaging system 2. This ensures that the emission area of the transmitting component 1 is injected in a focused manner into a comparatively small subregion of the end surface 61 of the optical waveguide. In contrast, the light that is to be received and is distributed over the entire end surface of the optical waveguide 6 is imaged on the receiving area of the receiving component 4 on the intermediate plane 3. That end surface 61 of the optical waveguide 6 which is imaged by the second imaging system 5 on the intermediate plane 3 is accordingly larger than the image of the transmitting component 1.

The end surface 61 of the optical waveguide 6, which is imaged on the intermediate plane 3, is annotated A in FIG. 1. The receiving area of the receiving component 4 is preferably at least as large as the image A of the end surface 61 on the intermediate plane 3, in order that the light that is emitted from the optical waveguide 6 is detected completely.

The light which is emitted from the transmitting component 1 passes through the intermediate plane 3, from the rear and passes through the receiving component 4 from the rear or passes by it at the side, as will be explained in more detail with reference to the further exemplary embodiments.

By way of example, the optical waveguide 6 has a diameter equal to or more than 50 µm, in particular a diameter of between 200 µm and 1 mm, and is, for example, a POF (Plastic Optical Fiber) waveguide. If an edge-emitting laser (if appropriate with deflection optics) is used, the emission area of the transmitting component is approximately 1 µm. The size of the receiving component is then, for example, 80 to 100 µm. If the laser diode used is a VCSEL, the emission area generally has a diameter of 4 to 5 µm for a monomode laser, and 15 µm for a multimode laser. When light is injected into polymer fibers, the transmitting components may also be even larger.

In this case, it is normally possible for the first imaging system 2 to produce an enlarged image or else a smaller image. This makes it possible, for example, for a relatively large receiving area of a multimode VCSEL of 15 µm to be imaged on a relatively small area in the region of the intermediate plane 3. This reduces the size of the unusable area of the receiving component 4. The second imaging system 5 can also produce an enlarged or smaller image.

Figure 2:
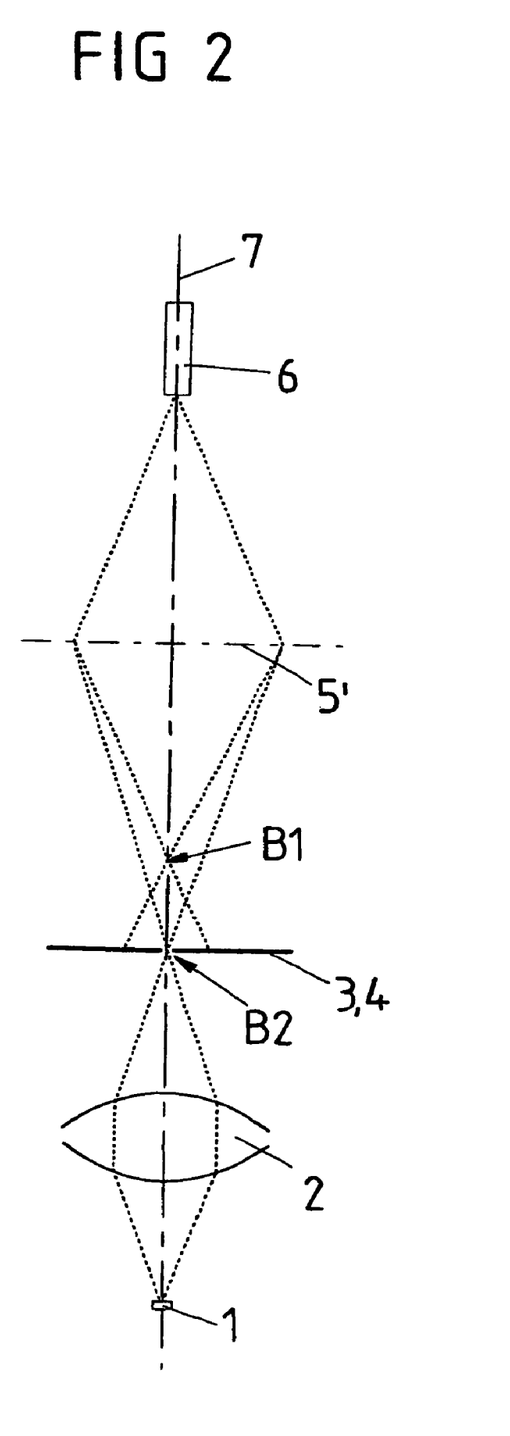
FIG. 2 shows a bidirectional transmitting and receiving device in which, as a modification to the device shown in FIG. 1, one imaging system is in the form of a Fresnel lens that focuses the light differently for different wavelengths.

FIG. 2 shows an alternative exemplary embodiment, in which the second imaging system 5' is a Fresnel lens. The focal length of a Fresnel lens is highly dependent on the wavelength of the radiation passing through it. In FIG. 2, the transmitting component 1 is at a shorter wavelength (for example 850 µm) than the light detected by the receiving component 4. Owing to its longer wavelength (for example 1300 µm), the radiation is in fact focused at the point B1 and then diverges again. The receiving component 4 is located on the plane of the focus B2 of the shorter-wavelength radiation from the transmitting component 1. In this case, this is sufficiently large to virtually completely detect the radiation from the optical waveguide 6, which has already been somewhat widened.

Figure 3:
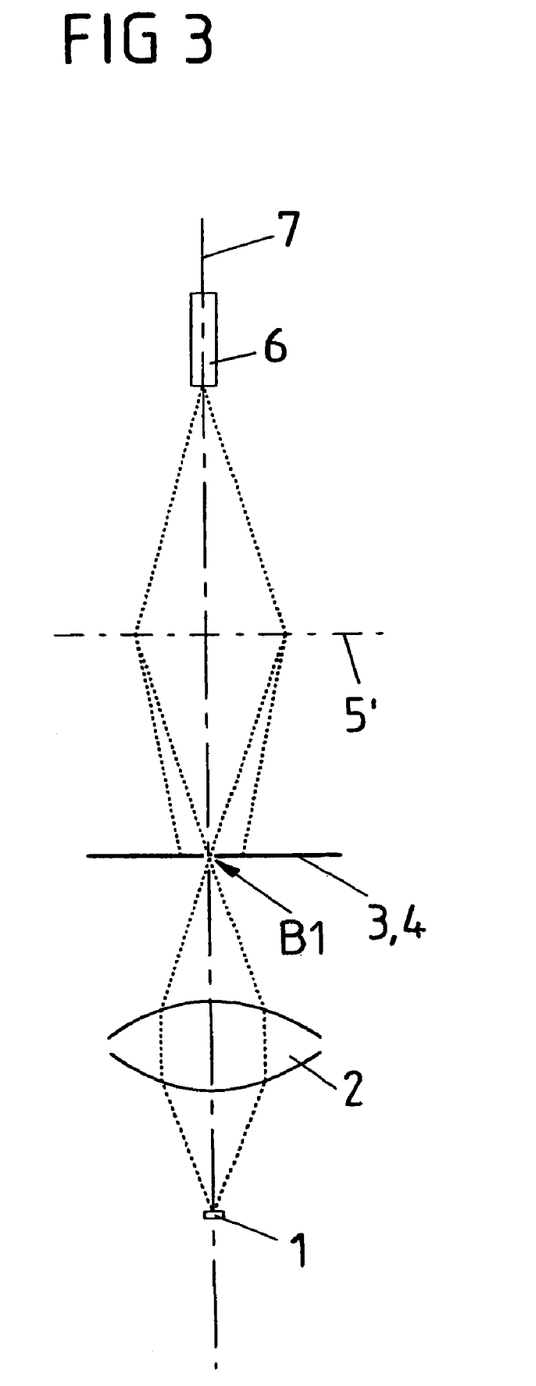
FIG. 3 shows a further exemplary embodiment of a bidirectional transmitting and receiving device having a Fresnel lens, in which the receiving component is arranged at a different focus of the Fresnel lens to that shown in FIG. 2.

FIG. 3 shows the opposite situation, in which the transmitting component 1 emits the longer-wavelength radiation. The receiving component 4 is arranged on the intermediate plane 3, on which the focus B1 of the second imaging system 5' for the longer-wavelength radiation is located. The radiation from the optical waveguide 6 with the shorter wavelength has not yet been focused on this imaging plane or the intermediate plane 3, and accordingly falls on the detector 4 over a large area.

The arrangements which are illustrated in FIGS. 2 and 3 can also be used very well in conjunction with optical waveguides with a small diameter such as single mode waveguides, since an enlarged detection area is provided via the arrangement of the receiving component 4 away from the focus of the radiation to be detected so that, as before, the image of the transmitting component 1 on the intermediate plane 3 is small in comparison to the receiving area of the receiving component 4. The important factor in this case is that the focus of the second imaging system 5' for the radiation which is emitted from the transmitting component 1 is located on the intermediate plane 3.

The following should also be mentioned. The end surface 61 of the optical waveguide 6 is arranged at a distance from the diffractive or Fresnel lens 5' such that the light which is emitted from the end surface 61 is focused by the diffractive lens 5'. The wavelength-dependent focal point is referred to as the focus B1, B2. The term focus is thus used to denote the locus or the distance from the Fresnel lens 5' on which the light which is emitted from the optical waveguide 6 is focused, or at which the image of the transmitting component 1 is located in order that its light is imaged on the optical waveguide 6. The focus is the locus of sharp imaging. The term focus therefore in no way refers only to a point or a distance at which parallel light is focused by a lens.

Figure 4:
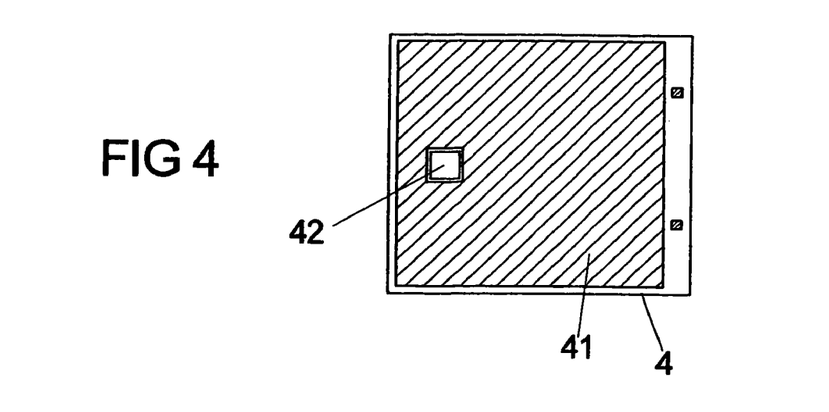
FIG. 4 shows a receiving component of a bidirectional transmitting and receiving device as shown in FIGS. 1 to 3, with the receiving component having an inactive area that has been kept free.

The other figures show various detector arrangements. FIG. 4 shows a receiving component as a photodiode 4 with a light-sensitive active receiving area 41. If the substrate of the photodiode 4 is transparent for the transmitted radiation form the transmitting component, but the receiving area 41 of the photodiode 4 absorbs this radiation and/or is sensitive to it, then area 42 with a small diameter or area is kept free in the detector surface 41 for the radiation to pass through, as is shown in FIG. 4. This is done, for example, by selective removal of the active material by etching in this area 42. The exposed layers of the diode are passivated in a known manner after exposure, in order to guarantee aging stability.

If the substrate of the photodiode 4 is not transparent to the radiation from the transmitting component 1, then an opening can be selectively etched from the rear face of the photodiode 4, through which the radiation can pass. One advantage of a nontransparent substrate is that the receiving component is influenced to a lesser extent by stray light.

Figure 5:
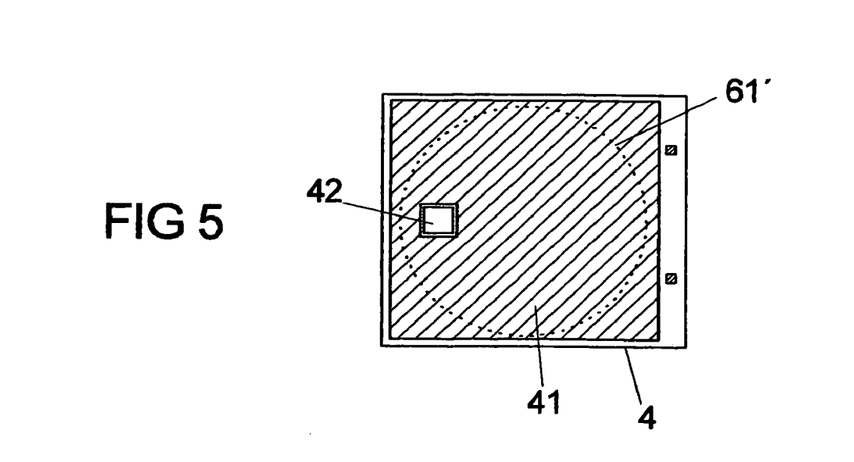
FIG. 5 shows a receiving component as shown in FIG. 4, with the image of the end surface of an optical fiber additionally being shown on the plane of the receiving component.

FIG. 5 also shows the image 61' of the end surface 61 of the optical waveguide 6 on the photodiode 4, which is imaged by the second imaging system 5, 5' on the intermediate plane 3. The area 42 which is kept free and through which the light from the transmitting component passes is in this case located within the image 61' of the end surface 61.

The area 42 that is kept free is relatively small in comparison to the receiving area 41. For example, the area 42 that is kept free has a diameter of 40 µm, while the diameter of the receiving area 41 is 200 µm. This corresponds to 4 percent, so that the sensitivity is reduced only to a minor extent.

Figure 6:
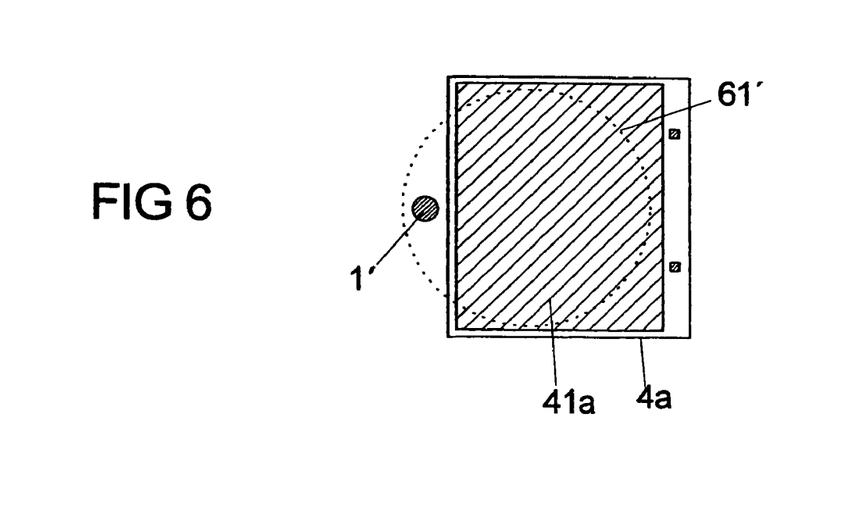
FIG. 6 shows an alternative exemplary embodiment of a receiving component for a bidirectional transmitting and receiving device as shown in FIGS. 1 to 3 in which the receiving component is shortened on one side, so that light which is emitted from the transmitting component passes by the receiving component at the side.

According to the refinement shown in FIG. 6, the photodiode 4a is arranged with the receiving area 41a adjacent to the focus 1' of the radiation from the transmitting component 1 on the intermediate plane 3, such that the emitted light passes by the receiving component 4a. The image 61' of the end surface 61 of the optical waveguide 6 on the photodiode 4a, which is imaged on the intermediate plane 3 by the second imaging system, is likewise shown. As can be seen, the image 1' of the transmitting component 1 is located within the image 61' of the end surface 61 of the optical waveguide 6. In this embodiment variant, that area of the image 61' of the optical waveguide that is not covered by the receiving component 4a is considerably larger than in the case of the refinements shown in FIGS. 4 and 5, so that the sensitivity is somewhat poorer. However, this makes use of a photodiode which can be produced considerably more easily.

FIGS. 7 to 11 show various compact arrangements of a transmitting component 1, a first imaging system 2 and a receiving component 4. The illustration always shows a VCSEL as the transmitting component 1, which is mounted on a photodiode 8 as a monitor diode. Instead of this, however, an edge-emitting laser with 90° beam deflection may, for example, also be used.

Figure 7:
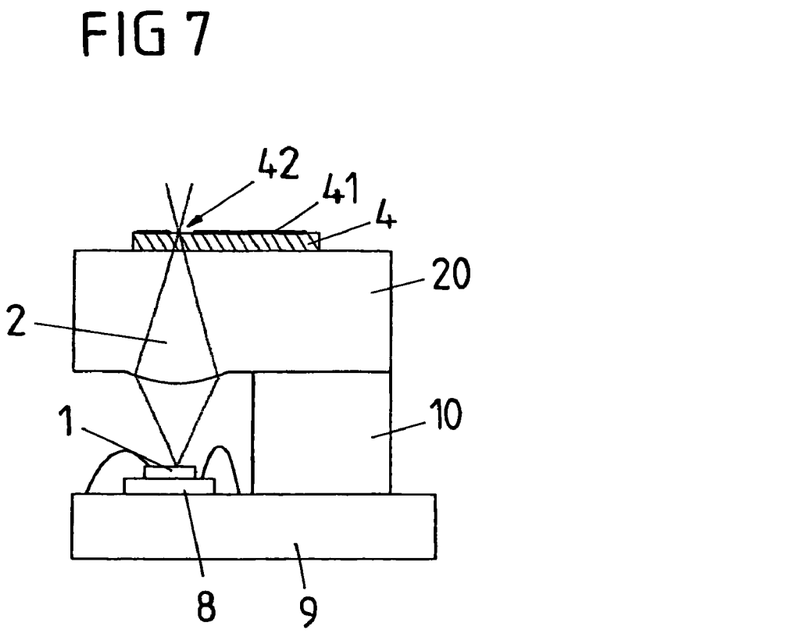
FIG. 7 shows a first module configuration for a bidirectional transmitting and receiving device, in which the first imaging system is in the form of a planar lens, on whose rear face the receiving component is arranged.

A planar lens 2 that is formed in a substrate 20, is mounted at a defined distance above the transmitter 1 in FIG. 7. A spacer 10 is provided for this purpose. The transmitter 1 and the monitor diode 8 are arranged on a mount 9. The receiving component 4 is arranged on the rear face of the lens 2 such that the focus of the transmitter 1 is located in the region 42 of the receiving area 41 that is kept free, as shown in FIGS. 4 and 5. The substrate of the receiving component 4 is essentially transparent, and radiation passes through it.

Figure 8:
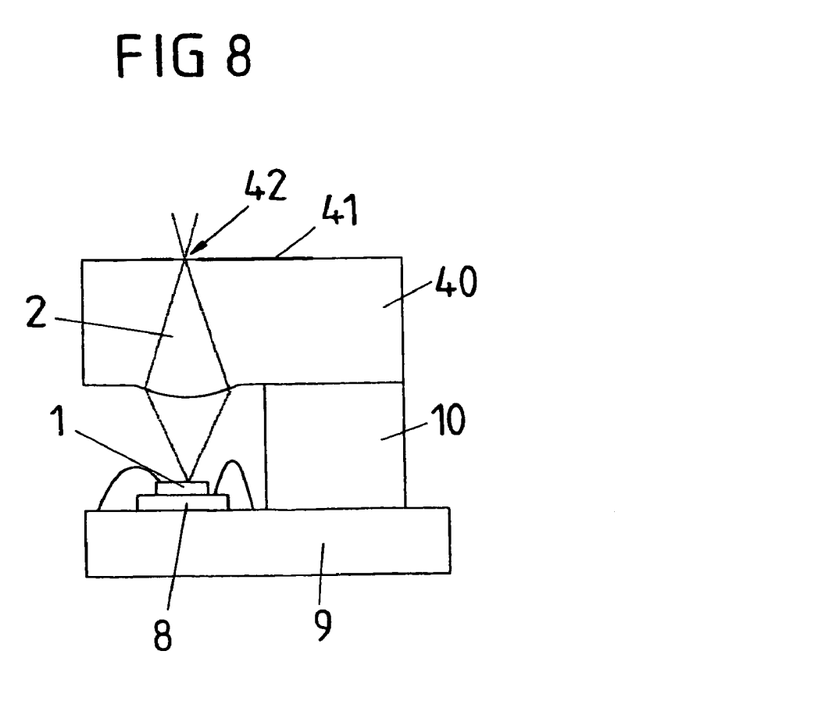
FIG. 8 shows a module as shown in FIG. 7, in which the first imaging system is integrated on the rear face in the substrate of the receiving component.

In FIG. 8, the imaging lens 2 that forms the first imaging system is integrated on the rear face in the substrate 40 of the receiving component 4.

Figure 9:
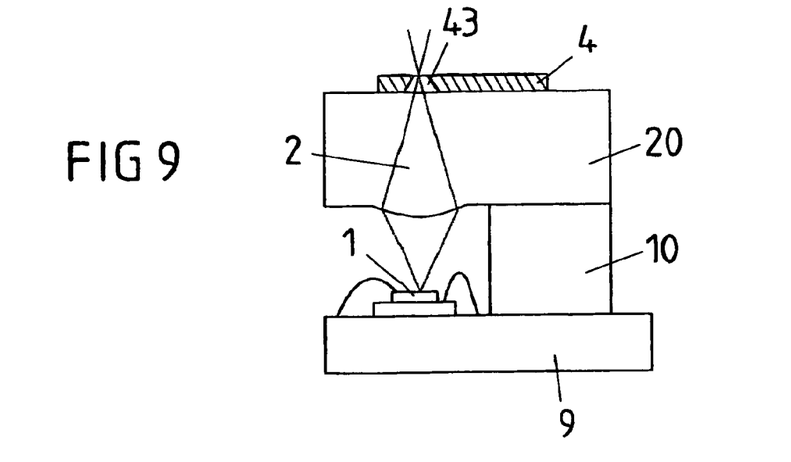
FIG. 9 shows a further variant of the module shown in FIG. 7, in which the receiving component has a cutout.

In FIG. 9, the receiving component 4 has an exposed area 43 for radiation to pass through the substrate. The substrate of the receiving component in this refinement is not transparent for the emitted light.

Figure 10:
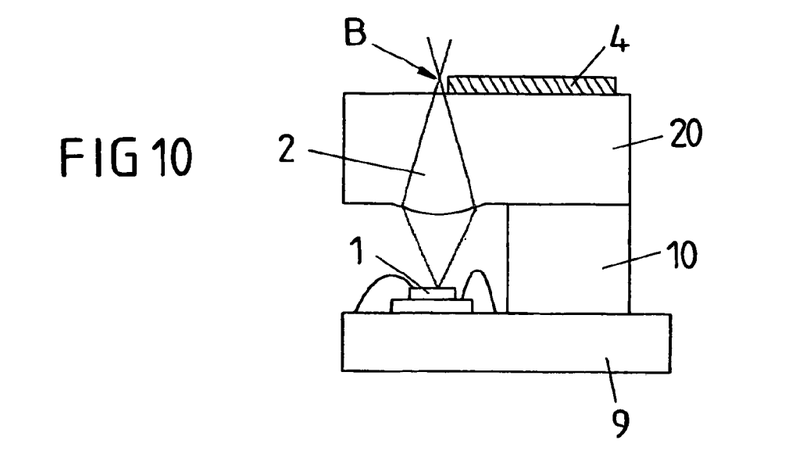
FIG. 10 shows a further refinement of a bidirectional transmitting and receiving device, in which the light which is emitted from a transmitting component passes by a receiving component at the side on an intermediate plane.

In FIG. 10, the receiving component 4 is positioned to the side closely adjacent to the focus B of the transmitted light, so that the transmitted light passes by the receiving component at the side.

Figure 11:
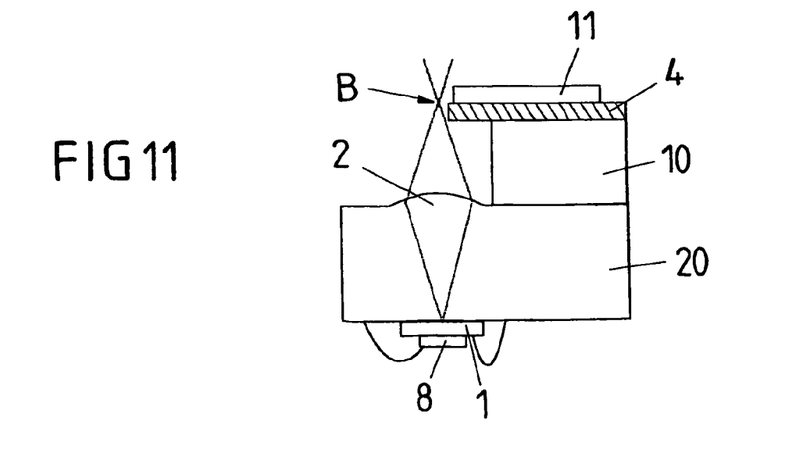
FIG. 11 shows a modular arrangement in which the transmitting component is mounted directly on the rear face of a lens substrate, and the receiving component is arranged such that it overhangs closely alongside the focus of the transmitted radiation.

In FIG. 11, the transmitter 1 and the monitor diode 8 are mounted directly on the lower face of a lens substrate 20. The opposite face of the lens substrate 20 forms the refractive lens 2. The receiving component 4 is fitted closely adjacent to the focus B of the transmitted radiation above a spacer 10, overhanging it at a defined distance. Furthermore, a filter 11 is mounted on the receiving component, in order to block reflected transmitted radiation. Alternatively, the wavelength-selective filer 11 may, of course, also be fitted directly to the sensitive surface of the receiving component 4.

Figure 12:
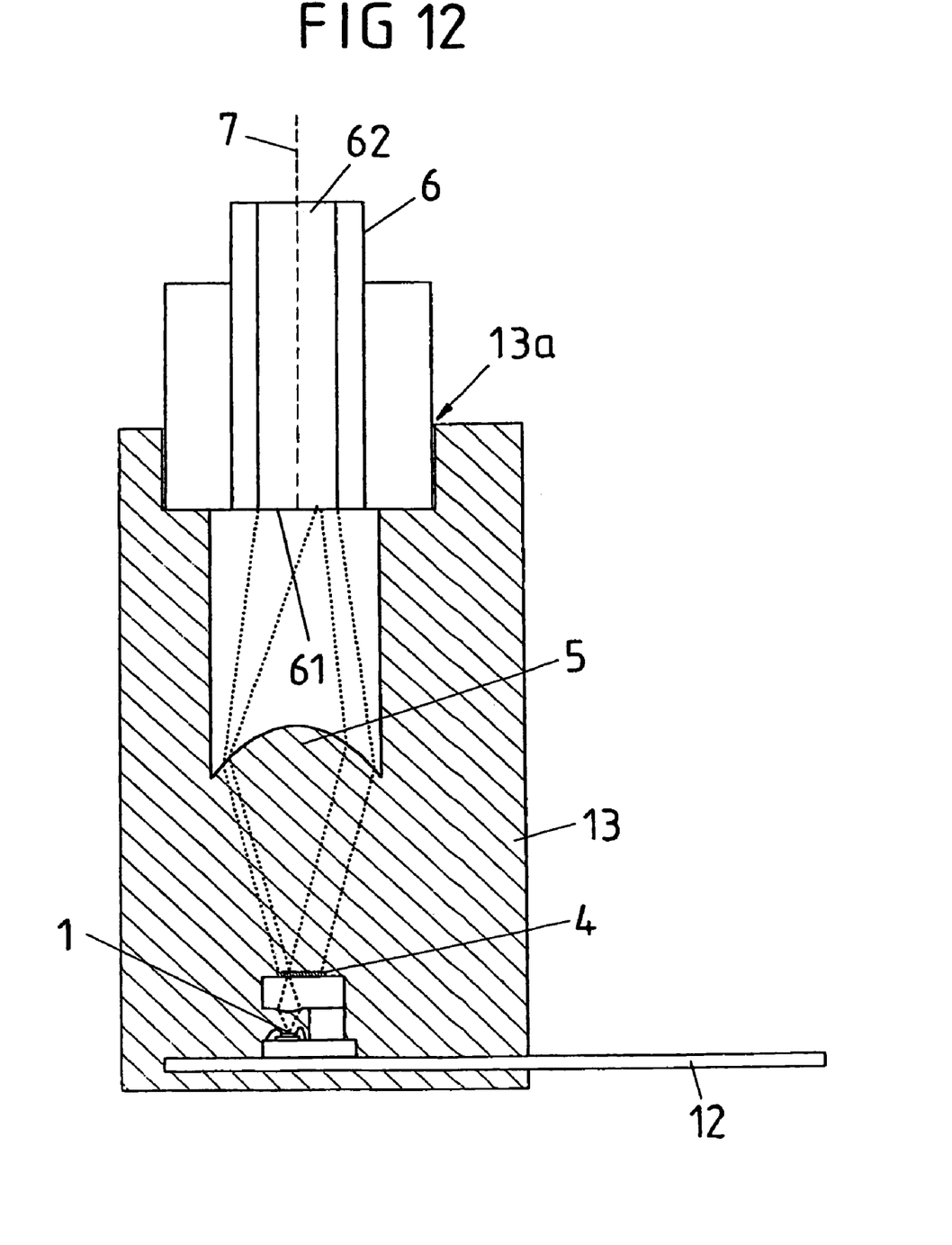
FIG. 12 shows a complete module arrangement for bidirectional data transmission with a leadframe, a transmitting component, a receiving component, a first and a second imaging system, and an optical waveguide.

FIG. 12 shows a complete module arrangement for bidirectional transmission. One of the arrangements described in the previous figures is mounted on a leadframe 12 and electrical contact is made with it (not shown separately). Furthermore, electronic components such as drivers for the transmitting component 1 and/or amplifiers for the receiving component 4 may also be mounted on the leadframe 9. This unit is surrounded with plastic 13, which is transparent for the wavelengths that are used. Above the assembly, the plastic is shaped to form a lens 5, which provides a second imaging system, and provides imaging on the waveguide 6. A guide holder 13a for the waveguide 6 is also formed in the plastic 13. The light from the transmitting component 1 is imaged on an area of the core 62 of the optical waveguide 6.

The radiation from the transmitting component 1 in the illustrated exemplary embodiment is imaged offset with respect to the optical axis 7 of the image on the end surface 61 of the fiber 6. This has the advantage, inter alia, that the reactions of the radiation on the transmitting component 1 can be kept low. The offset imaging is irrelevant to the injection of the light into the optical waveguide 6.

Figure 13:
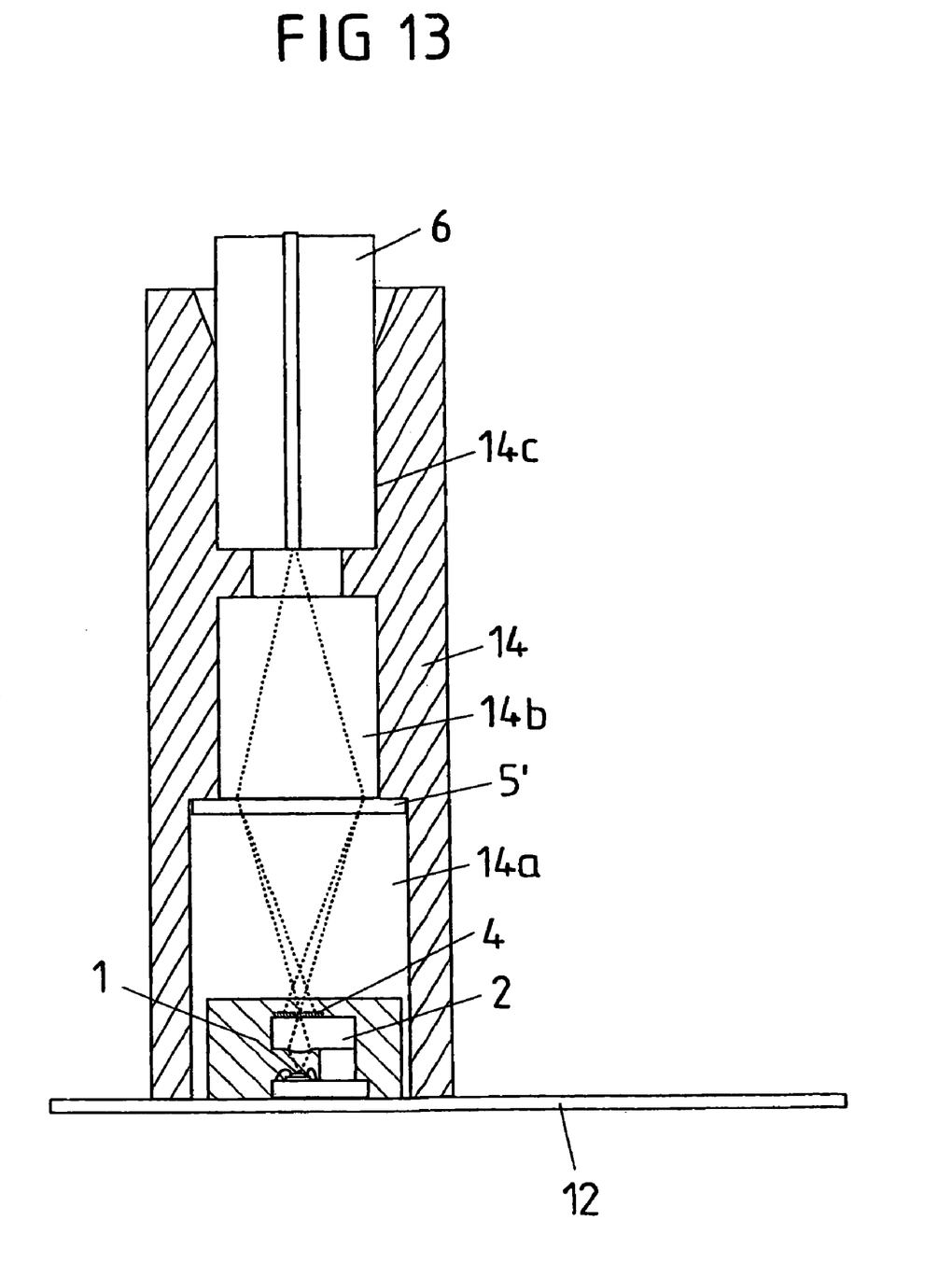
FIG. 13 shows a further complete module arrangement, in which one imaging system is in the form of a Fresnel lens system.

FIG. 13 shows a central beam path with a Fresnel lens 5', which is also suitable for injection into a monomode fiber 6. Imaging into the waveguide 6 is provided via the Fresnel lens 5'. Owing to the wavelength-dependent imaging characteristic of the Fresnel lens 5', the wavelength of the transmitting component 1 is injected directly and with a high coupling efficiency into the waveguide 6 and, at the same time, the radiation at a longer wavelength is imaged in a widened form, owing to the different focus position, onto the large receiving area of the receiving component 4.

The unit comprising the transmitting component 1, the first imaging system 2, the receiving component 4 and the Fresnel lens 5' is mounted on a mount 14. Three areas 14a, 14b, 14c are provided on the mount 14 for this purpose. The unit comprising the transmitting component 1, the first imaging system 2 and the receiving component 4 is inserted into the first area 14*a*. The junction between the first area 14*a* and the second area 14*b* is used as a stop for the Fresnel lens 5'. The third area 14*c* is used to hold an optical waveguide 6 that, for example, is in the form of a stub pin which, at its end that is not illustrated, has a plug for connection to an optical fiber.

The embodiment of the invention is not restricted to the exemplary embodiment described above. The only significant feature for the invention is that the light that is emitted from the transmitting component is imaged by means of a first imaging system on an intermediate plane, on which the receiving component is located. The second imaging system is used to provide coupling to an optical waveguide.

The invention claimed is:

1. A bidirectional transmitting and receiving device, comprising: a transmitting area of a first size; a receiving component comprising a receiving area of a second size; and coupling optics configured to couple light between the transmitting component and the receiving component on the one hand, and an optical waveguide to be coupled thereto on the other hand, wherein the coupling optics comprise two imaging component comprising an emission systems that are arranged one behind the other such that the light that is emitted from the transmitting component is imaged by the first imaging system onto an intermediate plane on which the receiving component is located, and in the process passes through the receiving component or passes by it at a side thereof, and wherein the second imaging system images firstly the light that is emitted by the transmitting component from the intermediate plane onto an end surface of the optical waveguide, and images secondly the light that is emitted by the optical waveguide onto a receiving area of the receiving component.

2. The device as claimed in claim 1, wherein the second imaging system is arranged with respect to the first imaging system such that an image plane for the imaged light from the end surface of the optical waveguide lies on the same plane as the intermediate plane of the first imaging system.

3. The device as clamed in claim 1, wherein the image of the transmitting component on the intermediate plane is imaged within the end surface of the optical waveguide by the second imaging system.

4. The device as claimed in claim 1, wherein the light that is emitted from the transmitting component is injected into a comparatively small subregion of the end surface of the optical waveguide, while the light that is to be received and is distributed over the entire end surface of the optical waveguide is imaged onto the receiving area of the receiving component.

5. The device as claimed in claim 1, wherein the image of the transmitting component on the intermediate plane is smaller than one third of the receiving area of the receiving component.

6. The device as claimed in claim 1, wherein the first or the second imaging system produces an enlarged or smaller image at the intermediate plane.

7. The device as claimed in claim 1, wherein the second imaging system comprises a diffractive lens that focuses light at different wavelengths differently, with the intermediate plane on which the light from the transmitting component is imaged being located at the focus of the diffractive lens for the emitted wavelength, so that the light that is emitted from the transmitting component is imaged on the end surface of the optical waveguide, while the receiving component is located away from the focus of the diffractive lens for the received light that is emitted from the optical waveguide at the second wavelength, whereby such received light is imaged at the intermediate plane in such a manner that it is widened again or has not yet been focused.

8. The device as claimed in claim 1, wherein the receiving component is substantially transparent for the wavelength that is emitted from the transmitting component.

9. The device as claimed in claim 8, wherein the receiving area of the receiving component comprises an inactive region through which the light that is emitted from the transmitting component passes.

10. The device as claimed in claim 1, wherein the receiving component comprises a cutout with a comparatively small area compared to the receiving area, through which the light that is emitted from the transmitting component passes.

11. The device as claimed in claim 1, wherein the first imaging system is formed on one face of a substrate, on whose opposite face the receiving component is arranged or formed.

12. The device as claimed in claim 1, wherein the transmitting component, the first imaging system, and the receiving component are encapsulated with a transparent plastic encapsulation material that forms the second imaging system.

13. The device as claimed in claim 12, wherein the plastic encapsulation material additionally forms a coupling area for an optical waveguide.

14. A bidirectional optical system, comprising: a transmitting component comprising an emission area having a first area associated therewith;

an optical waveguide having an end surface associated therewith facing the transmitting component; a receiving component disposed between the transmitting component and the optical waveguide, and comprising a receiving area having a second area associated therewith; a first imaging system disposed between the transmitting component and the receiving component, and configured so that light from the transmitting component is imaged onto an intermediate plane at which the receiving component is located; and a second imaging system disposed between the optical waveguide and the receiving component, and configured to image emitted light from the transmitting component onto a portion of the end surface of the optical waveguide, and image light from the optical waveguide onto the receiving area of the receiving component.

15. The optical system of claim 14, wherein the second imaging system is arranged with respect to the first imaging system such that an image plane for the image light from the end surface of the optical waveguide lies on the intermediate plane.

16. The optical system of claim 14, wherein the second area is larger than the first area.

17. The optical system of claim 14, wherein the second imaging system comprises a diffractive lens operable to focus light of differing wavelengths at differing distances therefrom.

18. The optical system of claim 17, wherein the diffractive lens comprises a fresnel lens.

19. The optical system of claim 17, wherein light from the optical waveguide has a wavelength that is greater than light emitted from the transmitting component, and wherein the intermediate plane is located at the focus of the diffractive lens for the light from the transmitting component, and wherein the intermediate plane is located in front of or beyond the focus of the diffractive lens for the light emitted from the optical waveguide.

20. The optical system of claim 14, wherein light emitted from the end surface of the optical waveguide substantially fills an end surface area associated therewith, and wherein the second imaging system is configured to focus the optical waveguide emitted light onto the intermediate plane associated with the receiving area, and wherein the light transmitted from the transmitting component is imaged onto the receiving component via the first imaging system with an area associated with the emission area, wherein the emission area is substantially less than the receiving area, and wherein the transmitted light is further imaged to the end surface of the optical waveguide via the second imaging system with an area thereat that is substantially less than the end surface area.

* * * * *